United States Patent [19]

Dur

[11] 3,837,290
[45] Sept. 24, 1974

[54] DEVICE FOR CONNECTING A SPORTING DEVICE, TRANSPORT DEVICE OR THE LIKE TO THE TOWROPE OF A TOW LIFT

[75] Inventor: Herbert Dur, Schwarzach, Austria

[73] Assignee: Firma Konrad Doppelmayr & Sohn, Wolfurt, Austria

[22] Filed: July 19, 1973

[21] Appl. No.: 380,731

[52] U.S. Cl. .......... 104/193, 24/201 A, 24/230 TC, 104/173, 104/202, 104/225
[51] Int. Cl. ............................................. B61b 7/20
[58] Field of Search .......... 104/170, 173 R, 173 ST, 104/193, 202, 225, 204; 294/82 R, 86 R, 89; 24/116 A, 116 R, 201 A, 2222 R, 222 BL, 230 TC; 105/369 A; 213/85, 96, 182

[56] References Cited
UNITED STATES PATENTS

| | | | |
|---|---|---|---|
| 404,903 | 6/1889 | Fisher | 104/193 |
| 1,720,472 | 7/1929 | Gagnon | 24/201 A X |
| 1,949,601 | 3/1934 | Burd | 24/201 A X |
| 3,161,930 | 12/1964 | Crosson | 24/201 A X |

*Primary Examiner*—Lloyd L. King
*Assistant Examiner*—Randolph A. Reese
*Attorney, Agent, or Firm*—Wenderoth, Lind & Ponack

[57] ABSTRACT

The invention relates to a device for connecting a sporting device, a transport device or the like to the towrope of a tow lift. The free end of the towrope is connected with a suspension piece and a receiving piece is arranged on the transport device, sporting device or the like. The receiving piece has a slot of a smaller breadth than the suspension piece, whereby the suspension piece, in the towing position, abuts the receiving piece behind said slot.

18 Claims, 5 Drawing Figures

PATENTED SEP 24 1974 3,837,290

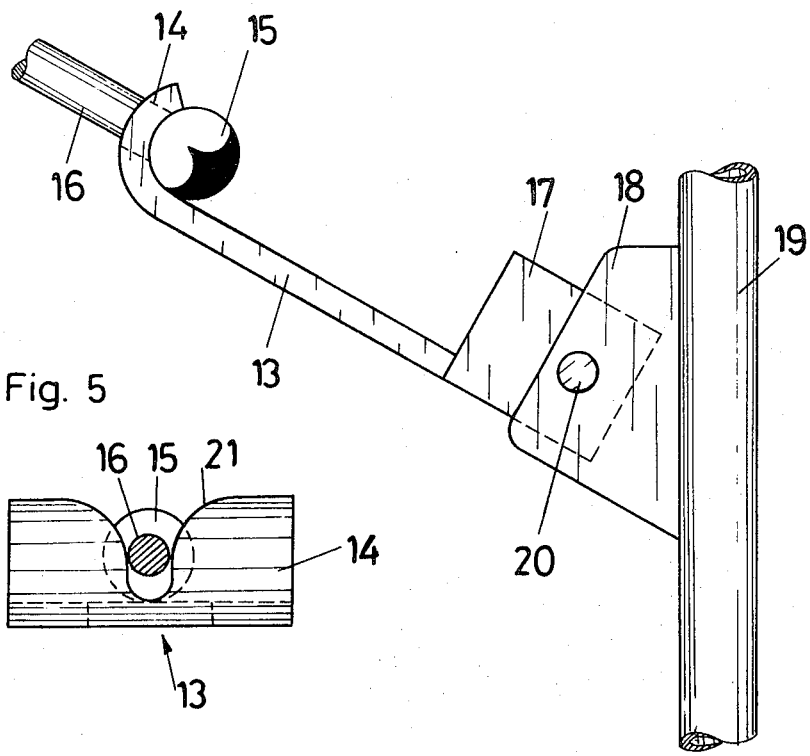
Fig. 3
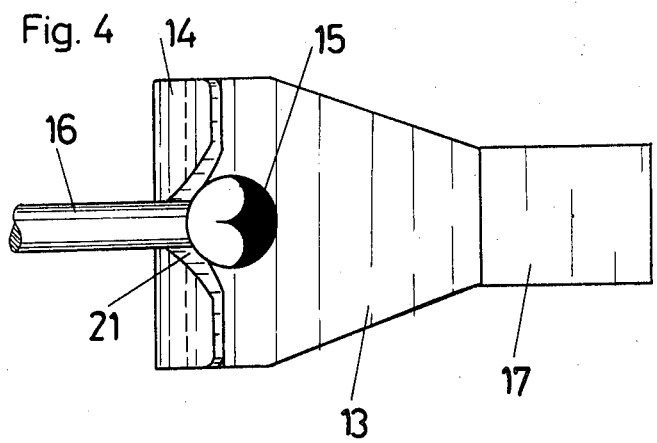
Fig. 5
Fig. 4

3,837,290

DEVICE FOR CONNECTING A SPORTING DEVICE, TRANSPORT DEVICE OR THE LIKE TO THE TOWROPE OF A TOW LIFT

BACKGROUND OF THE INVENTION

The invention relates to a device for connecting a sporting device, a transport device or the like to the towrope of a tow lift, the free end of the towrope being connected with a suspension piece, and a receiving piece being arranged on the transport device, sporting device or the like and having a slot of a smaller breadth than the suspension piece, whereby the suspension piece, in the towing position, abuts the receiving piece behind the slot.

Devices of this kind are mainly used on sleds, ski-bobs or the like to be able to equally transport sporting devices of this kind up the hill. Sporting devices of this character are not adapted to be transported with the assistance of the usual towing brackets. It is therefore necessary to provide special devices for attaching the towrope.

Several such devices are known in which, however, the problem of the release of the towrope has not been solved in a completely satisfactory manner. In mountainous areas the tow lift must be provided with a satisfactory release of the towrope, since otherwise bad accidents would occur. Several known devices have been constructed wherein the release is made possible by a falling slope provided in the terrain at the mountain station of the tow lift. The release of the towrope is thus achieved through vertically changing the direction of the towrope relative to the device.

Devices are also known wherein the person sitting on the sporting device must actuate a trip-releasing catch or a lever to disconnect the towrope and the device. However, all these devices are very complicated in construction and susceptible to faults. The susceptibility to faults is increased in so much as these devices are also used in extremely low temperatures. A further considerable disadvantage of the known devices is the high costs thereof and in the fact that these devices are not adaptable to be fixed to every sporting device, transport device or the like without modifying the construction thereof.

Furthermore, a type of bracket is known in which there is a space left between both end portions of the bracket. In this free space a tow bar is inserted, which bar on its free end is provided with an enlarged plate. This plate abuts from behind the bracket so that a form-locking joint is achieved. With this device an automatic release is impossible. As a result, disconnecting of the device can take place only by stopping the tow lift, which would hardly be desirable considering the great number of people using ski tows nowadays. Apart from this, an enormous tractive force would be required every time the fully loaded tow lift was to be started again.

SUMMARY OF THE INVENTION

It is the object of the present invention to avoid these shortcomings by providing a receiving piece in the form of a jacket, a shackle or the like, having an opening interconnected with the slots, which opening is larger in breadth than a suspension piece arranged with free mobility within the receiving piece behind the slot. The suspension piece, on the towrope being moved a specific angle from a vertical longitudinal median plane through the device, is automatically released from the slot with the assistance of the steerable part of the device to be towed.

According to the invention a device very simple in construction is created which functions quite satisfactorily. Accordingly, at the mountain station of the tow lift the passenger has only to laterally deviate his sporting device, which lateral deviation can be attained through a particular arrangement of the terrain, so that the suspension piece would automatically be released from the slot of the receiving piece. No complicated component parts such as springs, ratchet lever, cable lines or the like are required.

A device of this kind may easily and without high expenditure be arranged on an already existing sporting or transport device.

A further advantage of the present invention in comparison with the known devices is that the towrope may easily be connected to the sporting device, transport device or the like. Accordingly, at a connection station in a valley there are no difficulties in connecting the towrope with the device. The suspension piece need only be inserted from the top into the receiving piece having the form of a jacket, a shackle or the like so that a close connection is ensured.

Further characteristics and advantages of the invention will be described in more detail with reference to the drawings without the invention, however, being limited to the examples shown.

BRIEF DESCRIPTION OF THE DRAWINGS

FIGS. 1 and 2 and
FIGS. 3 through 5, respectively, show first and second embodiments of the invention wherein
FIG. 1 is a section taken along line I—I in FIG. 2,
FIG. 3 is a lateral view,
FIG. 4 is a top plan view and
FIG. 5 is a front view, respectively, of the second embodiment.

DETAILED DESCRIPTION OF THE INVENTION

Figure 1:
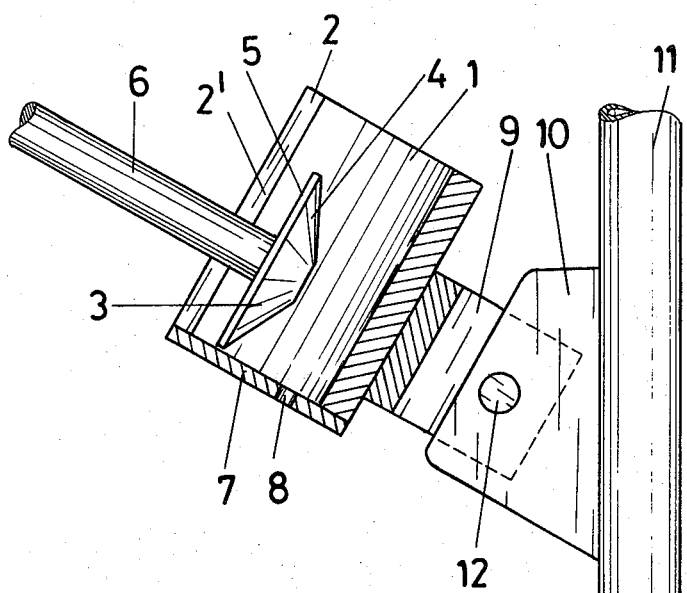
Figure 2:
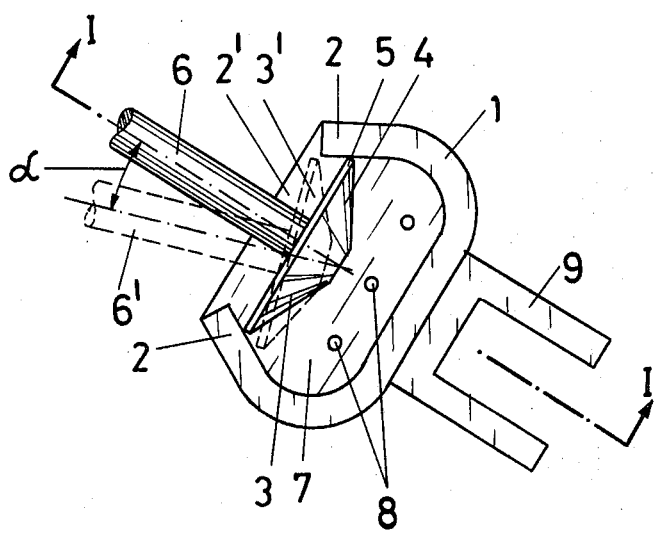

In the embodiment according to FIGS. 1 and 2 the receiving piece 1 has the form of a substantially U-shaped bent shackle, the free ends of sides 2 of which converge in an acute angle so as to form a slot 2'. The free ends of sides 2 thereby are equally spaced from a vertical longitudinal median plane, i.e., a plane through line I—I in FIG. 2, and lie in a plane forming an acute angle with a vertical plane at a right angle to the median plane. It is most suitable if a plane contacting the free ends of sides 2 is arranged perpendicular to the longitudinal direction of towrope 6.

Shackle 1 on its bottom side is closed off with the assistance of a plate 7 so that suspension piece 3 arranged on the free end of towrope 6 cannot slide downwardly out of shackle 1. This plate 7 preferably is provided with one or several bores 8 to permit the flow-off of melted snow and ice which may accumulate therein. On its top side the shackle is open over its total interior cross section so that towrope 6 may readily be fixed from the top of shackle 1.

Suspension piece 3 is disk-shaped and its diameter is larger than the breadth of the slot of shackle 1. On attaining a specific angle between the vertical median plane of the shackle and towrope 6, the side of suspension piece 3 angularly moved in the direction of the vertical median plane is released from contact with its respective side 2 of shackle 1 and suspension piece 3 is released from the slot.

In FIG. 2 the release position is illustrated in dotted lines, towrope 6' being deflected to such an extent that suspension piece 3', as shown in the drawing, can slide off the right side of shackle 1.

Suspension piece 3 is formed of a truncated cone 4 and a cylindrical body 5 provided on the side closer to towrope 6. As a result, there is only very little contact between suspension piece 3 and shackle 1 so that the release can take place more easily than if the suspension piece were larger and having more area of contact with the shackle. Suspension piece 3 naturally may have merely the form of a truncated cone-shaped body, the base of which having the greater diameter being closer to towrope 6. In such a device the marginal portion of the suspension piece would wear down more rapidly. Apart from this, it would also be possible to provide a reinforcement in the form of a flat, cylindrical or prismatic body. It has been disclosed above that the suspension piece has a circular cross-section. It is to be readily understood that suspension piece 3 may also have the form of a square or rectangular body or any other appropriate shape.

On a sporting device, a transport device or the like, that is on the steerable part of such a device, a shackle 10 is arranged which shackle is provided with a bore to receive a bolt 12. On shackle 1 a U-shaped connector 9 is arranged which connector on both sides thereof embraces shackle 10, a swiveling attachment being attained after having inserted bolt 12. Thereby the receiving part having the form of a shackle 1 is adjustable to every existing angular position of towrope 6, since the towrope because of the variable terrain does not always have the same inclination during the towing process. Through this measure it is also ensured that suspension piece 3 will not by itself slide upwardly off shackle 1.

In the embodiment according to FIGS. 3 through 5 the receiving piece has the form of a straight shackle 13, which shackle on the end thereof opposite the end to be fixed to the device to be towed has an upwardly curved part 14. Curved part 14 of shackle 13 is provided with a slot 21 constantly widening towards the free uppermost end of curved part 14 of the shackle. In the present device suspension piece 15 has the form of a sphere or a spherical segment. Slot 21 on its lower portion closest to the straight part of shackle 13 has substantially the same breadth as the diameter of towrope 16. Accordingly, with a linear load between towrope 16 and shackle 13 it is impossible for suspension piece 15 to be released from slot 21. However, when towrope 16 is angularly displaced sidewise with respect to the length of shackle 13, towrope 16 is urged upwardly out of slot 21 by the upwardly sloping side thereof, so that suspension piece 15 can be released from the shackle. To ensure a relatively rapid and easy release it is suitable that the height of curved part 14 of shackle 13 substantially corresponds to the diameter of suspension piece 15.

In this embodiment, too, a swivel connection to a steerable part 19 of a sporting device or the like is provided. In this case, a connection block 17 is arranged on shackle 13, which block through bolt 20 is fixed to shackle 18 of steerable part 19 to swivel vertically around bolt 20.

It is naturally also possible within the scope of the invention to rigidly fix shackle 1 and 13 to the sporting device, the transport device or the like, namely the steerable part of such a device. This is particularly possible if the tow lift is arranged on a terrain with a substantially constant inclination. It is to be readily understood that an appropriate jacket may be provided instead of shackle 1, 13, which jacket on its front portion is provided with a slot.

The present invention provides substantial advantages which are of particular importance especially for winter sporting such as sleds and ski-bobs. There is not only the extremely simple construction but also the easy manipulation which are particularly noticeable. Apart from this, the device can be manufactured and mounted at favorable costs.

What we claim is:

1. A device for connecting a sporting device, transport device or the like with the towrope of a tow lift, said device comprising:

a suspension piece attached to the free end of the towrope;

a receiving piece arranged on said transport device, sporting device or the like, said receiving piece having therein a slot, said slot having a lowermost closed end of a smaller breadth than said suspension piece, said slot having an uppermost open end whereby said suspension piece, in the towing position, abuts said receiving piece behind said slot, said receiving piece having the form of a jacket, a shackle or the like;

said receiving piece having a space immediately behind said slot, said suspension piece being mounted for free movement in said space in said receiving piece behind said slot; and said suspension piece, when said towrope is moved a predetermined angle from a vertical longitudinal median plane through said device, being automatically releasable from said slot.

2. A device as claimed in claim 1, wherein said receiving piece has the form of a substantially U-shaped bent shackle, the free ends of the sides of which converge in an acute angle to form said slot, said free ends being equally spaced from said vertical median plane, and lying in a plane forming an acute angle with a vertical plane at a right angle to said median plane.

3. A device as claimed in claim 2, further comprising a plate closing said shackle on the bottom side thereof, said plate having therein at least one opening.

4. A device as claimed in claim 1, wherein said suspension piece comprises a flat cylindrical body connected with said towrope and a truncated cone arranged thereon.

5. A device as claimed in claim 1, wherein said receiving piece has the form of a straight shackle, which shackle on the end thereof opposite the end to be fixed to the device has an upwardly curved part, said curved part having therein said slot, said slot constantly widening towards the free end of said upwardly curved part of said shackle, and said slot being open on the top thereof.

6. A device as claimed in claim 5, wherein said suspension piece has the form of a sphere or a spherical segment.

7. A device as claimed in claim 6, wherein the height of said upwardly curved part of said shackle substantially corresponds to the diameter of said spherical suspension piece.

8. A device as claimed in claim 7, wherein said slot on the lower portion thereof adjacent the straight part of said shackle has a breadth substantially the same as the diameter of said towrope.

9. A device as claimed in claim 1, wherein said receiving piece is pivotally arranged on a steerable part of said device to be towed about an axis extending horizontally with respect to said longitudinal median plane of said device.

10. A device for connecting a sporting device, transport device or the like with the towrope of a tow lift, said device comprising:
   a suspension piece attached to the free end of the towrope;
   a receiving piece, arranged on said sporting device, transport device or the like, for releasable attachment to said suspension piece;
   said receiving piece having therein slot means for receiving said towrope with said suspension piece abutting said receiving piece when in the towing position, and for automatically releasing said suspension piece from said receiving piece when said towrope is moved a predetermined angle from a vertical longitudinal median plane through said device; and
   said slot means having a lowermost closed end of a smaller breadth than said suspension piece and an uppermost open end.

11. A device as claimed in claim 10, wherein said receiving piece has the form of a substantially U-shaped bent shackle, the free ends of the sides of which converge in an acute angle to form said slot means, said free ends being equally spaced from said vertical median plane, and lying in a plane forming an acute angle with a vertical plane at a right angle to said median plane.

12. A device as claimed in claim 11, further comprising a plate closing said shackle on the bottom side thereof, said plate having therein at least one opening.

13. A device as claimed in claim 10, wherein said suspension piece is composed of a flat cylindrical body connected with the towrope and of a truncated cone arranged thereon.

14. A device as claimed in claim 10, wherein said receiving piece has the form of a straight shackle, which shackle on the end thereof opposite the end to be fixed to the device has an upwardly curved part, said curved part having therein said slot means, said slot means constantly widening towards the free end of said upwardly curved part of said shackle, and said slot means being open on the top thereof.

15. A device as claimed in claim 14, wherein said suspension piece has the form of a sphere or a spherical segment.

16. A device as claimed in claim 15, wherein the height of said upwardly curved part of said shackle substantially corresponds to the diameter of said spherical suspension piece.

17. A device as claimed in claim 16, wherein said slot means on the lower portion thereof adjacent the straight part of said shackle has a breadth substantially the same as the diameter of said towrope.

18. A device as claimed in claim 10, wherein said receiving piece is pivotally arranged on a steerable part of said device to be towed about an axis extending horizontally with respect to said longitudinal median plane of said device.

* * * * *